(12) United States Patent
Wagoner

(10) Patent No.: US 7,643,318 B2
(45) Date of Patent: Jan. 5, 2010

(54) DUAL VOLTAGE WYE-CONNECTED H-BRIDGE CONVERTER TOPOLOGY FOR POWERING A HIGH-SPEED ELECTRIC MOTOR

(75) Inventor: Robert G. Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 11/809,690

(22) Filed: Jun. 1, 2007

(65) Prior Publication Data

US 2008/0298096 A1    Dec. 4, 2008

(51) Int. Cl.
H02H 7/122    (2006.01)
(52) U.S. Cl. .................................................. 363/56.02
(58) Field of Classification Search .............. 363/56.02, 363/56.03, 56.04, 56.05, 132
See application file for complete search history.

(56) References Cited

U.S. PATENT DOCUMENTS

| | | | | |
|---|---|---|---|---|
| 4,502,106 A | * | 2/1985 | Glennon | 363/56.02 |
| 4,567,553 A | * | 1/1986 | Foch et al. | 363/98 |
| 5,491,622 A | * | 2/1996 | Carosa | 363/56.02 |
| 5,576,943 A | * | 11/1996 | Keir | 363/56.05 |
| 6,930,899 B2 | * | 8/2005 | Bakran et al. | 363/132 |

* cited by examiner

*Primary Examiner*—Adolf Berhane
(74) *Attorney, Agent, or Firm*—Edward J. Smith; Ernest G. Cusick; Frank A. Landgraff

(57) ABSTRACT

A topology for a three-phase, wye-connected H-bridge converter allowing continued operation when one H-bridge phase has failed by bypassing the failed H-bridge, increasing dc-bus voltage to provide the required output load voltage, and decreasing switching frequency to reduce power losses in semiconductor switches. In normal operation, the dc-bus voltage is operated at a lower voltage, improving the reliability of power semiconductor devices. When an H-bridge is bypassed, the dc-bus is operated at a higher voltage but lower effective switching frequency, reducing semiconductor losses, allowing the converter to put out more current with the same temperature rise in the power switches.

20 Claims, 7 Drawing Sheets

FIG. 2A Configuration for normal operation (N).

FIG. 2B Configuration with one H-bridge bypassed (N-1).

DUAL VOLTAGE WYE-CONNECTED H-BRIDGE CONVERTER TOPOLOGY FOR POWERING A HIGH-SPEED ELECTRIC MOTOR

BACKGROUND OF THE INVENTION

The present invention is related to the following GE applications Ser. No. 11/809,122, filed on May 31, 2007, respectively.

The invention relates generally to a topology for a three-phase, wye-connected H-bridge converter that allows continued operation when one H-bridge phase has failed and more particularly to a topology that reduces power losses in semiconductor switches, allowing the wye-connected H-Bridge converter to put out more current with the same temperature rise in the power switches.

High-speed, high-power electric motors (HSEM) that operate at variable speed are increasingly required in a range of industrial, mining and drilling activities. Further, the activities often require a high-degree of reliability. In operations such as crude oil pumping from remote global locations where access to pumping stations is difficult and time-consuming, reliability of motor operation is necessary to prevent dangerous, costly and extended outages. Simple, sturdy and reliable power converters are requisites for such high-speed, high-power motor operations. It is well known that providing multiple individual components, such as series or parallel semiconductor switches, may increase the likelihood that any one individual component switch may randomly fail. Added elements such as snubber circuits for semiconductor switches, further increases the number of components that can fail. It is desirable to arrange the power converter in a simple configuration, with as low a part component count as is possible. However, individual components such as the semiconductor switches for the power converted must be operated with satisfactory margin to thermal and other functional limits to prevent failures in the simplified configuration.

A simplified three-phase, wye-connected H-bridge converter 10 configuration is illustrated in FIG. 1. Each phase of the converter includes a power source/sink 20 with a dc power shaping circuit, represented by capacitor 30. The power source/sink 20 and dc power shaping circuit, represented by capacitor 30, establish a dc-bus voltage input to the semiconductor switches of the bridge. Insulated-gate bipolar transistors (IGBTs) 40 with built-in diodes 45 may form each leg of the H-bridges 50, for example, but other power semiconductor switches such as integrated-gate commutated thyristors (IGCTs) or metal-oxide semiconductor field-effect transistors (MOSFETs) could be used instead. The type of power semiconductor switch is not important to the analysis. Each H-bridge includes two legs, an output leg 60 and a neutral leg 65. Each phase output, phase A 70, phase B 75 and phase C 80, is connected to the midpoint 85 of the respective output bridge leg 60. Each neutral connection to wye-point 90 is tied to the midpoint 95 of the respective neutral output leg 65.

Gating controls 115 may provide control signals 116, 117, 118 for switching semiconductor switches 40 of Phases A, B and C of the H-bridge converter 10, according to predetermined switching patterns. Gating controls may provide for synchronous switching or asynchronous switching to the semiconductor switches 40 of the H-bridges 50.

While the above-described three-phase, wye-connected H-bridge converter provides simplicity, should failure occur in one of the phase H-bridges, operation of large high-speed electric motors (HSEMs) loads will be interrupted.

Accordingly, to assure availability of operation of the motor loads, it is desirable to provide a converter topology that can survive failure of any one phase of the H-bridge circuit, but at the same time reduce switching losses and harmonic distortion.

BRIEF DESCRIPTION OF THE INVENTION

It would be desirable to operate the H-bridge converter with a lower dc-bus voltage under normal operating conditions and with higher dc-bus voltage during operation with a failed H-bridge output. Further it would be desirable to operate the H-bridge converter during normal operation with zero-current notched switching signals in order to minimize switching loss and maximize bridge output power capability and at the same time to provide voltage and current harmonics that are lower than other prior art switching waveforms. Operation with a failed H-bridge output may utilize a non-notched synchronous switching signal when providing continuity of power is more critical than harmonic control.

Briefly in accordance with one aspect of the present invention, a three-phase, wye-connected H-bridge converter is provided. The H-bridge converter includes a plurality of semiconductor H-bridge output phases. Each H-bridge output phase includes a power source, a dc-bus, an output leg and a connecting leg. A phase output is provided for the converter from a midpoint of each output H-bridge leg. A connecting output from a midpoint of each connecting semiconductor H-bridge leg is provided. The connecting outputs from the H-bridge connecting legs are tied at a common wye-point. A gating source for the semiconductor H-bridge converter is provided. A plurality of H-bridge bypass contactors are included, with at least one bypass contactor being connected between the phase output and the connecting output of each H-bridge output phase. A control function for operating with a failed H-bridge output phase is provided.

According to another aspect of the present invention, a method is provided for operating a three-phase, wye-connected H-bridge converter. The converter may include a plurality of semiconductor H-bridge output phases, each H-bridge output phase with a dual-voltage power source, where the dual level voltage source provided by high voltage and low voltage taps of an associated transformer secondary winding through dc bus contactors and rectifiers. The converter may further include a dc-bus; an output leg and a connecting leg; a phase output of the converter from a midpoint of each output H-bridge leg; a connecting output from a midpoint of each connecting semiconductor H-bridge leg tied at wye-point. The converter may also include a H-bridge bypass contactor for each H-bridge output phase; a low voltage source and a high voltage source to the dc-bus; and a gating source for the semiconductor H-bridge.

The method includes maintaining the H-bridge bypass contactor for each H-bridge output phase in an open state for all H-bridge output phases functioning normally and closing the H-bridge bypass contactor for one failed H-bridge output phase. The method further includes supplying a low voltage source to the dc-bus when all H-bridge output phases are functioning normally and supplying a high voltage source to the dc-bus when one H-bridge output is failed.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
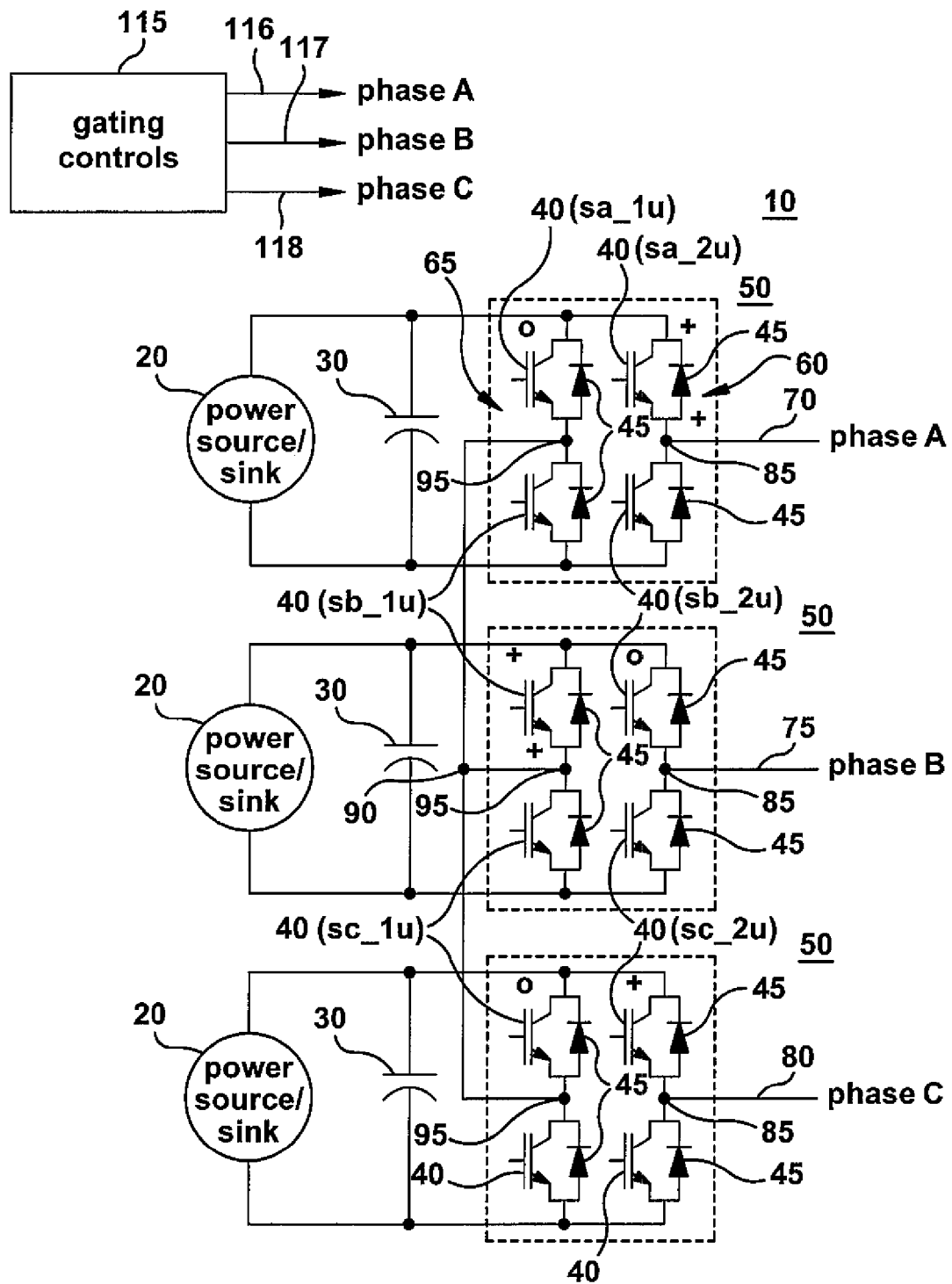
FIG. 1 illustrates a simplified three-phase, wye-connected H-bridge converter configuration.

The following embodiments of the present invention have many advantages, including providing a converter that has a capability to continue operation with failure of an H-bridge output phase. This new topology allows for the dc-bus to be operated at two different voltage levels, depending upon the mode of operation. In normal operation the dc-bus voltage is operated at the lower level, which reduces the power loss in the semiconductor switches, allowing the wye-connected H-bridge converter to put out more current with the same temperature rise in the power switches. This also improves the reliability of the power switches. When an H-bridge output phase has failed, the failed bridge can be bypassed, and the dc-bus voltage is operated at the higher level to increase output voltage capability. The inventive H-bridge converter utilizes synchronous switching waveforms in both normal operation and operation with one H-bridge phase bypassed. Zero current switching patterns with notches are utilized during normal operation, thereby providing current and voltage harmonics that are lower than prior art switching waveforms, while at the same time minimizing switching loss and maximizing bridge output power capability. Synchronous switching without notches may be utilized with two functioning H-bridge output phases to reduce effective switching frequency for the semiconductor devices, thereby allowing higher output currents from the functioning H-bridges without exceeding thermal limits.

According to one aspect of the present invention, a three-phase wye-connected H-bridge converter is provided for powering high-speed electric motors. This topology was chosen to provide high reliability for operation where continuity of operation is critical to the mission of the equipment. The reliability is enhanced due to simple controls and the lowest number of power semiconductor switches possible for the application. Further, the invention may allow cost reductions by utilizing "off-the-shelf" semiconductor switches rather than specialized components. The invention may also result in reliability improvements by eliminating the need for R-C snubbers.

The inventive topology allows for the dc-bus to be operated at two different voltage levels, depending upon the mode of operation. In normal operation the dc-bus voltage is operated at the lower level, which reduces the power loss in the semiconductor switches, allowing the wye-connected H-bridge converter to put out more current with the same temperature rise in the power switches. This also improves the reliability of the power switches. When a bridge has failed, the failed bridge can be bypassed, and the dc-bus voltage is operated at the higher level to allow the full load voltage to be maintained, thereby helping to maintain load.

In an exemplary case of the inventive topology, a 6 MW motor rated at approximately 17,000 RPM is designated as the load for the converter. The power factor of the motor determines the relationship between the converter output voltage and the load current. When synchronous switching includes notching, the notch position can be optimized to minimize switching loss by adjusting its position based on the particular power factor of a particular motor.

The inventive converter topology utilizes two different levels of dc-bus voltage to optimize the output power for two different modes of operation, normal mode (N) and operation with one H-bridge phase failed (N-1). The power sources for the H-bridges may be rectified transformer windings. By making two transformer secondary windings available, the bridge can be operated at two different dc-bus voltage levels.

In normal operation (N), the dc-bus voltage is operated at a lower dc-voltage level, which limits the switching loss in the power semiconductors, and also improves the reliability of all power semiconductor devices that operate from this dc-bus voltage. In normal operation (N), the harmonic distortion to the load is minimized which results in the most efficient operation of the load.

When an H-bridge has failed, it is bypassed (N-1). The dc-bus for the (N-1) configuration is operated at a higher voltage level, to allow the converter to operate with a normal load voltage. In this situation, the load may be operated at a lower than rated speed under rated current or lower than rated current, in which case the operating H-bridge outputs provide a lower output frequency. The lower output frequency means a slower switching rate for the semiconductor devices (reducing losses in the semiconductor devices due to the slower switching rate associated with the lower output frequency). With the lower switching rate the semiconductor devices of the two operating H-bridge phase outputs can provide a higher output current for driving the motor load with two phases, without exceeding thermal or other functional limits for the devices.

Further, different gating pulse patterns for the semiconductor switches may be used for the three H-bridge output phase operation and for one failed H-bridge output phase operation, as will be later described. The pulse patterns further serve to ameliorate switching losses in the condition with one failed H-bridge output phase and also manage harmonic distortion.

Figure 2:
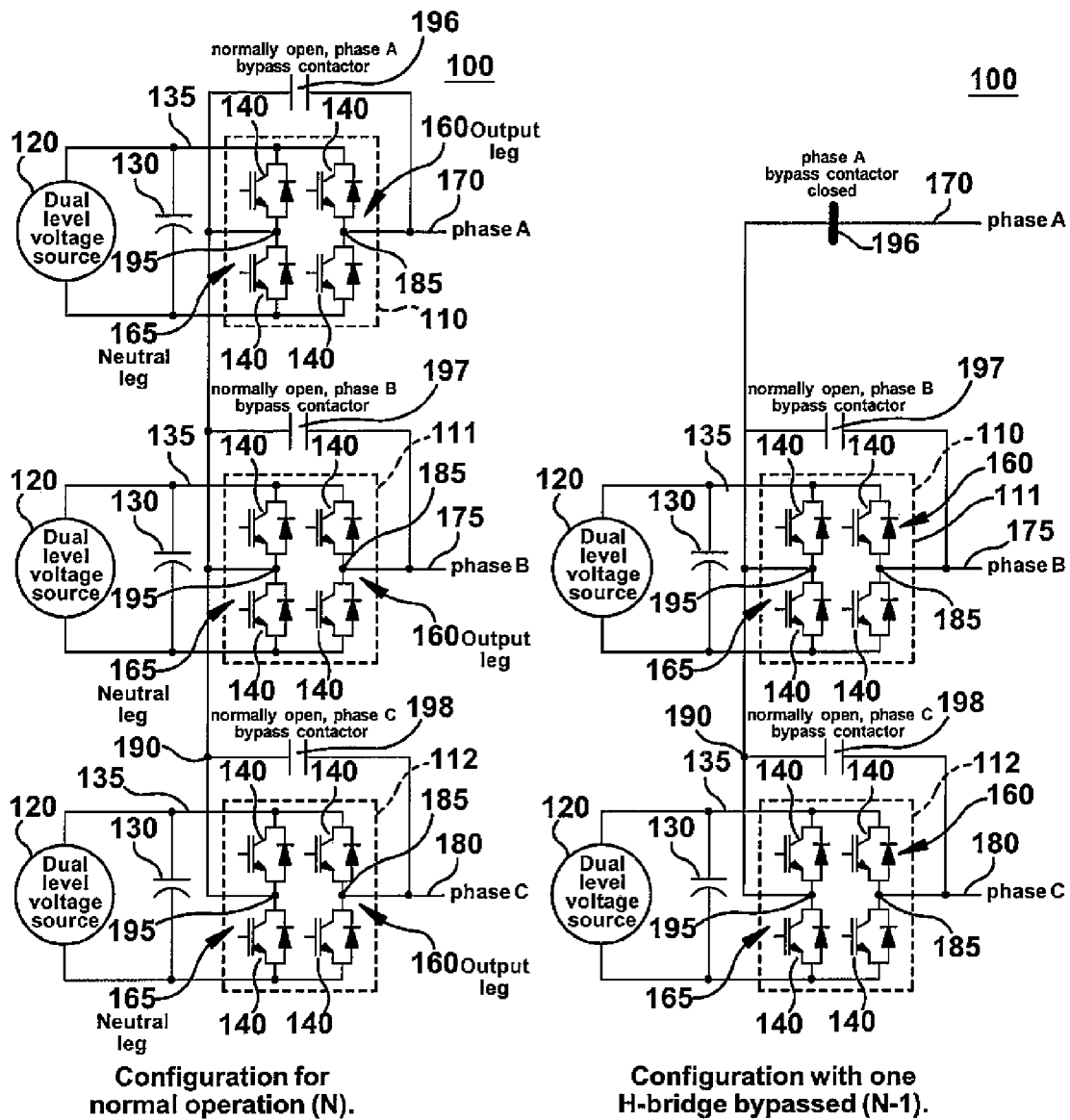
FIG. 2A illustrates a simplified schematic for an embodiment of the inventive three-phase wye-connected H-bridge converter with bypass contactors for H-bridge phases in a normal operating configuration.
FIG. 2B illustrates a simplified schematic for an embodiment of the inventive three-phase wye-connected H-bridge converter with bypass contactors for H-bridge phases having one H-bridge bypassed.

FIG. 2A illustrates a simplified schematic for an embodiment of the inventive three-phase wye-connected H-bridge converter 100 with bypass contactors for phases A, B and C 110, 111, 112 of the H-bridge converter 100 in a normal operating configuration. FIG. 2B illustrates a simplified schematic for an embodiment of the inventive three-phase wye-connected H-bridge converter 100 with bypass contactors for H-bridge phases A, B and C 110, 111, 112, having one H-bridge phase 110 bypassed.

Normal operation of the H-bridge converter 100 is illustrated in FIG. 2A. Each phase 110, 111, 112 of the converter includes a dual level voltage source 120 with a dc power shaping circuit, represented by capacitor 130. The dual level voltage source 120 and dc power shaping circuit, represented by capacitor 130, establish dc voltage that inputs to the semiconductor switches 140 of the H-bridge. The semiconductor switches 140 may be insulated-gate bipolar transistors (IGBTs) 140 with built-in diodes 145, forming each leg of the H-bridges 150, for example. However, other power semiconductor switches such as integrated-gate commutated thyristors (IGCTs) or metal-oxide semiconductor field-effect transistors (MOSFETs) could be used instead. The type of power semiconductor switch is not important to the analysis. Each H-bridge includes two legs, an output leg 160 and a neutral leg 165. Each phase output, phase A 170, phase B 175 and phase C 180, is connected to the midpoint 185 of the respective output bridge leg 160. Each neutral connection to wye-point 190 is tied to the midpoint 195 of the respective neutral output leg 165. A contactor provides control for H-bridge bypass contacts 196, 197, 198 associated with each H-bridge phase. The H-bridge bypass contactors are open during normal three-phase operation of the H-bridge. The dual level voltage source 120 provides a low voltage and a high voltage output (not shown). In normal operation the dual level voltage source 120 supplies the low voltage output to the dc-bus 135.

Operation with a failed H-bridge is represented in FIG. 2B. For example, operation with a failed H-bridge 110 at phase A 170 causes the H-bridge bypass contactor 196 for phase A 170 to be closed. Closing the H-bridge bypass contactor 196 ties the connecting output 195 and the phase output 185 of the failed H-bridge phase 110, effectively bypassing the phase and providing the output from the wye-point 190 to the bypassed H-bridge output at phase A 170. With a failed H-bridge, the dual level voltage sources 120 for the two operating H-bridge phases provide a high voltage output to the dc-bus 135.

Figure 3:
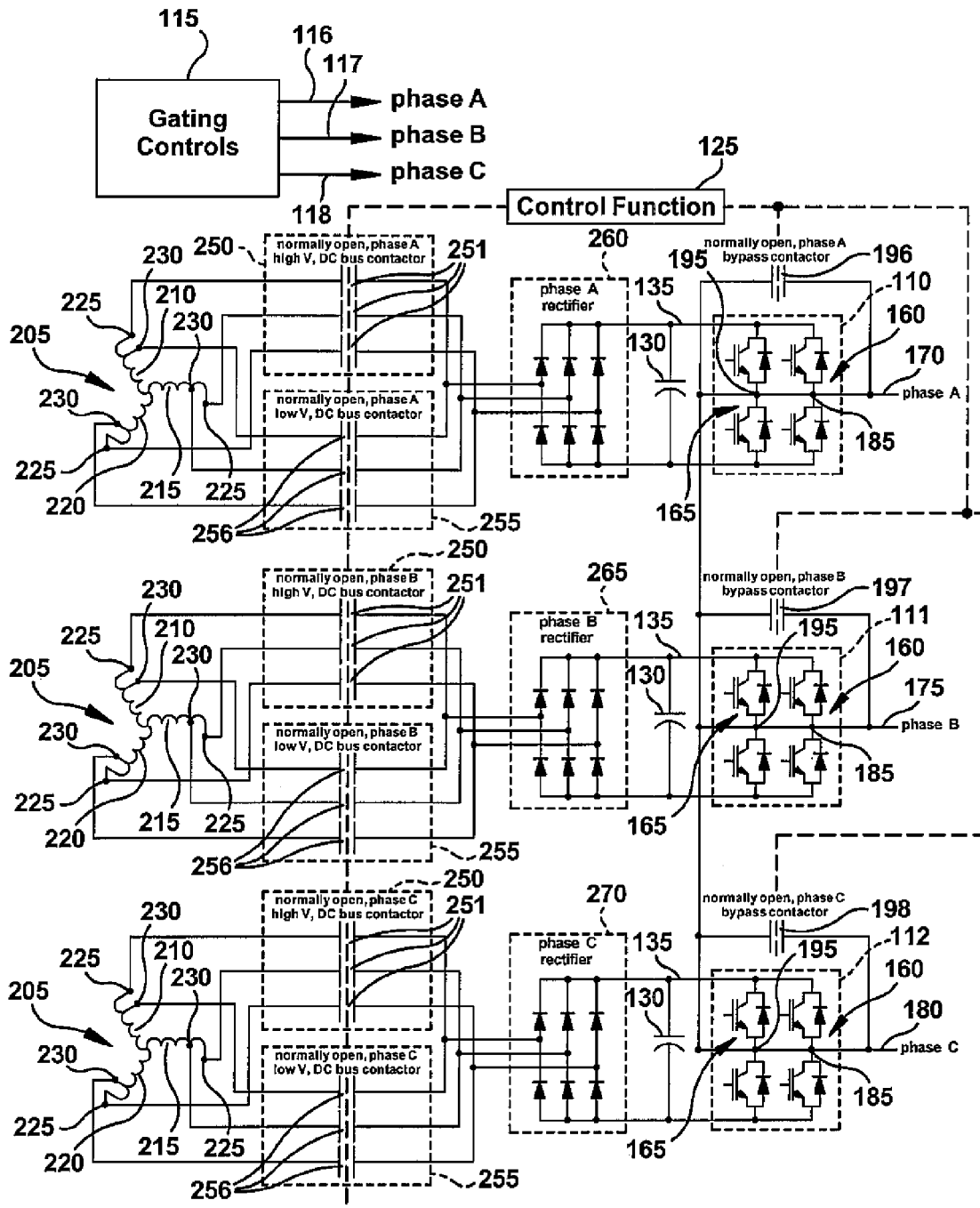
FIG. 3 illustrates a schematic for one embodiment of the inventive H-bridge topology where two different contactors are used to select different voltage outputs on secondary windings of a dual voltage transformer.

FIG. 3 illustrates a schematic for one embodiment of the inventive H-bridge topology with a dual level voltage source. Two separate contactors may used to select different voltage outputs on secondary windings of a dual voltage transformer. Each H-bridge output phase 110, 111, 112 includes a three-phase power transformer secondary winding 205, where the secondary winding 205 feeding each H-bridge phase includes high voltage taps 225 and low voltage taps 230 off the transformer secondary windings of phase 1 210, phase 2 215 and phase 3 220. The low voltage outputs and the high voltage outputs are fed to rectifier banks 260, 265, 270 for the respective phase, which may be provided as a three-phase, full-wave diode rectifier bank. A dc voltage is output from the rectifier banks 260, 265, 270 at dc-bus 135. The selection of the high voltage taps 225 or the low voltage taps 230 to provide the input voltage to the rectifier banks 260, 265, 270 is performed by high voltage dc-bus contactor 250 and the low voltage dc-bus contactor 255, for the associated phase. The low voltage tap 230 is selected for normal operation with three phases of the H-bridge. The high voltage tap is selected for operation with a failed H-bridge phase. Phase A, Phase B and Phase C bypass contactors 196, 197, 198 are used to bypass the output from any corresponding H-bridge phase that has failed.

A control function 125 may provide control of contactors. According to the control function, all the H-bridge bypass contactors 196, 197, 198 are open for normal three-phase H-bridge operation, allowing the output from all H-bridges to feed the motor load (not shown). An individual H-bridge bypass contactor 196, 197, 198 is closed for failed operation the respective H-bridge phase. The control function may also control individual contacts 255 of the Phase A, Phase B and Phase C low voltage contactors 256 to the closed state and control individual contacts 251 of Phase A, Phase B and Phase C contactor 250 to the open state during normal 3 phase H-bridge operation to supply a low voltage for normal operation. The control function may further control individual contacts 256 of Phase A, Phase B and Phase C contactors 255 for functioning H-bridge output phases to the closed state when one H-bridge output phase has failed and control all individual contacts 251 of the Phase A, Phase B and Phase C contactors 250 to supply a high voltage for the two H-bridge output phase operation.

Figure 4:
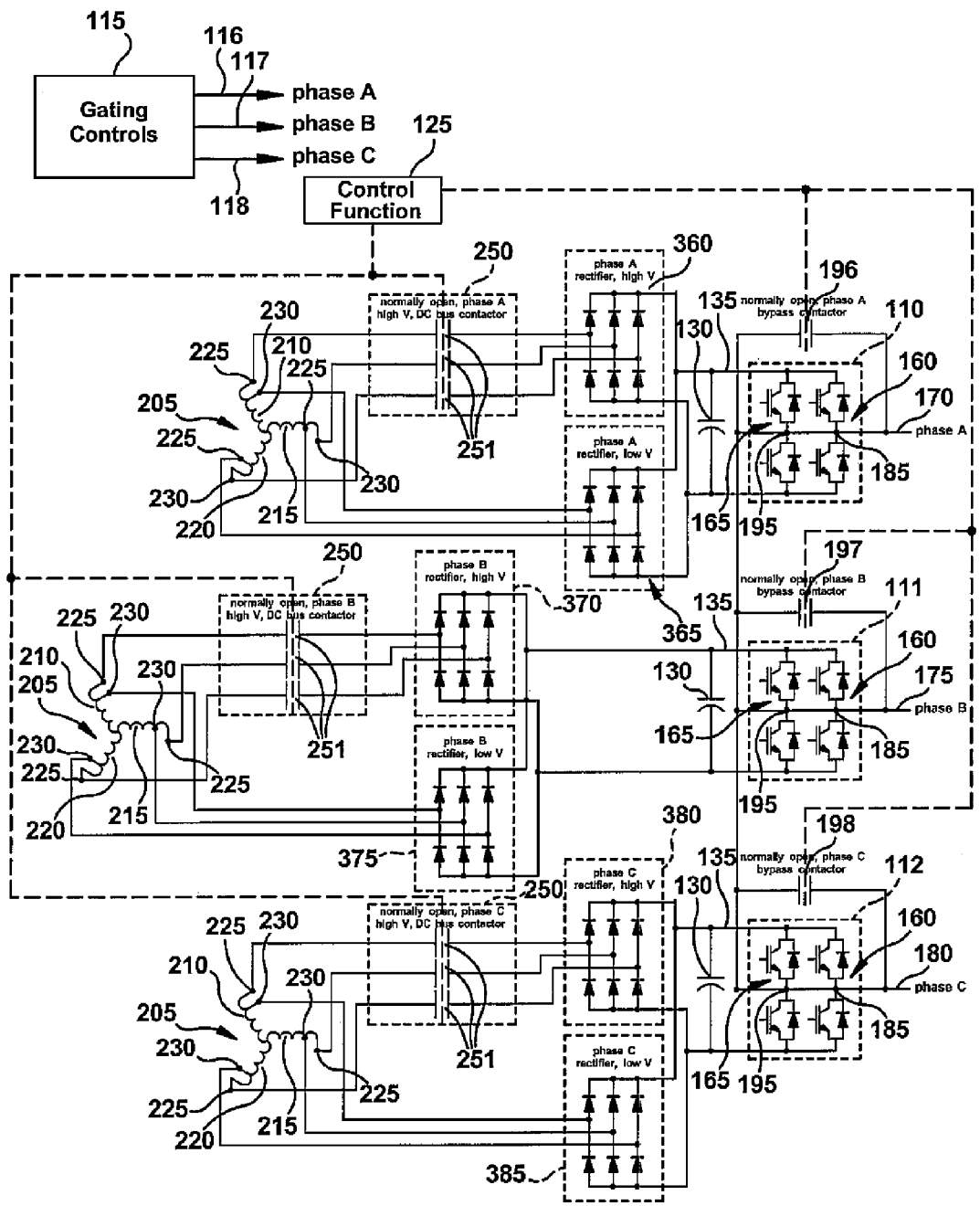
FIG. 4 illustrates a schematic for a second embodiment of the inventive H-bridge topology where a single contactor is used to select different voltage outputs on secondary windings of a dual voltage transformer.

FIG. 4 illustrates a schematic for a second embodiment of the inventive H-bridge topology where an alternate arrangement may be provided to select different voltage taps on secondary windings of a dual voltage transformer. A low voltage rectifier 365, 375, 385 is connected directly to the low voltage taps 230 of transformer secondary winding 205. Rectified dc is provided from the output of low voltage rectifiers 365, 375, 385 to the dc-bus 135 for the respective H-bridge output phase 110, 111, 112 during normal operation. During N−1 operation in the two operating H-bridge output phases, a high voltage rectifier 360, 370, 380 is connected to high voltage taps 225 through contacts 251 of high voltage contactor 250 for the functioning H-bridge output phases. When output from the high voltage taps 225 is supplied to the high voltage rectifiers 360, 370, 380 for the functioning H-bridge phases, the rectified high voltage output back-biases the output from the low voltage rectifiers 365, 375, 385 for functioning H-bridge phases, causing the high voltage output to supply the dc-bus 135.

A control function 125 may provide control of contactors. According to the control function, all the H-bridge bypass contactors 196, 197, 198 are open for normal 3 phase H-bridge operation and the individual H-bridge bypass contactor 196, 197, 198 is closed for failed operation the respective H-bridge phase. The control function may control individual contacts 256 of Phase A, Phase B and Phase C contactors 255 for functioning H-bridge output phases to the closed state when one H-bridge output phase has failed and control all individual contacts 251 of the Phase A, Phase B and Phase C contactors 250 to supply a high voltage for the two H-bridge output phase operation.

While transformer taps with selecting high voltage and low voltage contactors are illustrated, it should be recognized that other configurations for establishing dual voltage outputs on the dc-bus could be employed at the cost of additional complexity.

The control function for the H-bridge phase may be manual based on operator input or may be controlled automatically in response to predetermined conditions of failure of the H-bridge phase as monitored by the control function.

Figure 5A:
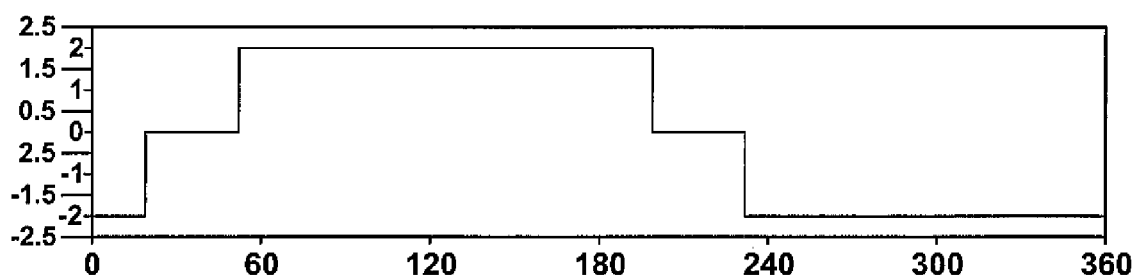
FIG. 5A illustrates a three-step output of a single H-bridge.
Figure 5B:
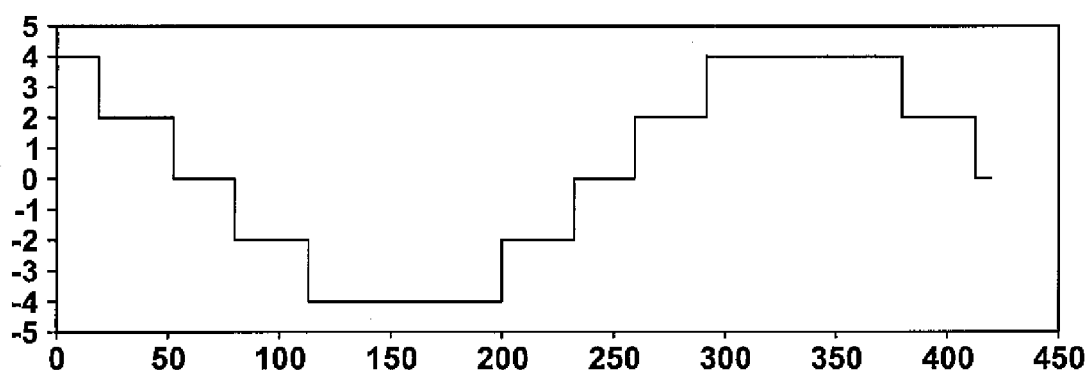
FIG. 5B illustrates a five-step output line-to-line voltage across two phases of the H-bridge converter during normal operation.

Several synchronous switching schemes for the three-phase wye-connected H-bridge converter may be considered with respect to the operation of large motors. The switching schemes establish a fundamental voltage output frequency for driving the motor. The switching output of one phase of the H-bridge (between the midpoints of the respective legs) may establish a positive step output, a negative step output and a zero-value output, known as a three-level output, as shown in FIG. 5A. However in the three-phase wye-connected configuration, the output phase voltage to output phase voltage (for example phase A to phase B) will provide a five-level output due to the combination of steps from the H-bridge of phase A and the H-bridge of phase B, as illustrated in FIG. 5B. Higher number of levels of output voltage will more closely simulate a sinusoidal wave and reduce harmonic distortion to the motor. However, with one failed H-bridge output, the voltage output between the phase output for an operating H-bridge and the bypassed phase output for a failed H-bridge corresponds to the voltage generated across only the one functioning H-bridge (three-level output).

Referring to FIG. 3 and FIG. 4, gating controls 115 provides control signals 116, 117 and 118 to the semiconductor devices 40 for phases A, B and C of H-bridge converter 10 according to predetermined switching patterns or waveforms.

According to one aspect of the present invention, a zero-current switching waveform is provided for the three-phase wye-connected H-bridge to power a large high-speed electric motor (HSEM) during normal, three-phase operation. The switching waveform includes two notches per cycle on the switching waveform provided to each of the semiconductor switches. The switching waveform is referred to as a ZC (Zero Current) notch2 waveform.

According to the ZCnotch2 switching waveform, notches are placed at or near a line-current zero-crossing to minimize switching loss and maximize bridge output power capability. IGCT gate drive power is reduced due to the low gate charge for switching events at low current, thereby improving the reliability of IGCT gate drive circuit. The ZCnotch2 switching waveform further may minimize total harmonic distortion through proper selection of notch placement, with respect the zero-crossing of line-current, and notch width.

The ZCnotch2 switching waveform makes the effective switching frequency equal to two times the fundamental frequency. However, the semiconductor and gate drive power dissipation is still low. The Zcnotch2 switching waveform may further be optimized to equalize power semiconductor losses between upper and lower devices in each leg of the H-bridge, thereby promoting margin to operating limits. Further, the ZCnotch2 switching waveform utilized in H-bridge, retains the property that the output voltage at the output of every H-bridge is symmetrical, eliminating even harmonics.

Figure 6:
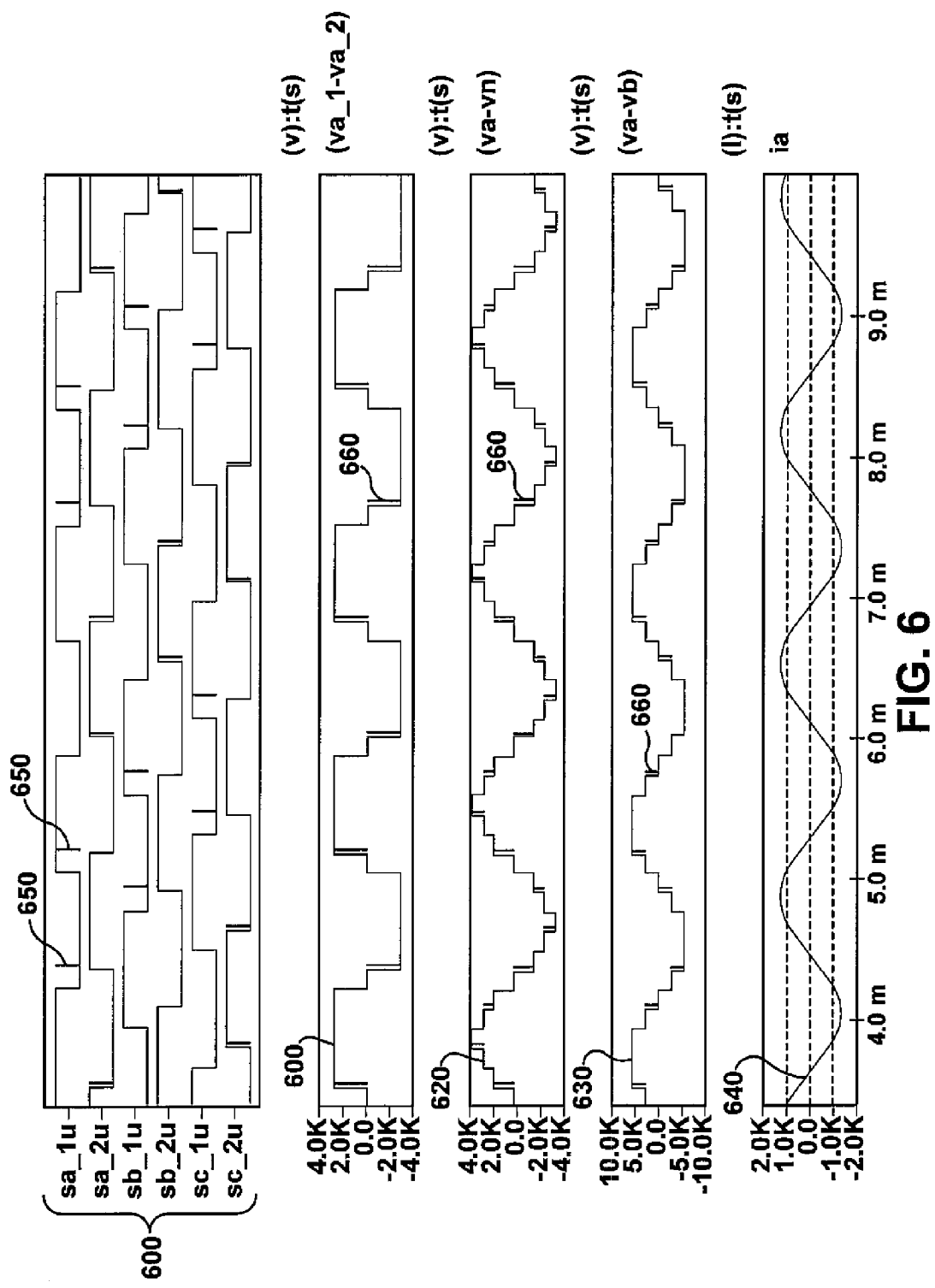
FIG. 6 provides a graph illustrating typical input and output waveforms for a three-phase, wye-connected H-bridge in normal operation employing an optimized ZCNotch2 switching waveform.

FIG. 6 provides a graph illustrating input and output waveforms for a three-phase, wye-connected H-bridge employing an optimized ZCnotch2 switching waveform. The ZCnotch2 waveform incorporates a notch of a designated width at a designated offset from the zero-crossing of the load current. The first graph 600 illustrates the ZCnotch2 signals to the upper switches sa_1u, sa_2u, sb_1u sb_2u, sc_1u, and sc_2u (referring to the upper switches in leg 1 and leg 2 of phase A, phase B and phase C of the H-bridge of FIG. 1). The second graph 610 illustrates the voltage between the midpoints of leg 1 and leg 2 of the phase A of the H-bridge. The third graph 620 illustrates the voltage between phase A output and the neutral. The fourth graph 630 illustrates line-to-line voltage between phase A output and phase B output. The fifth graph 640 illustrates load current output. Examples of switching waveform notches 650 and output waveform notches 660 are identified.

During N-1 operation with one H-bridge output bypassed, continuity of power to the motor load is the critical factor. Power output to the motor load is inherently distorted in this condition, so the advantages of the ZCnotch2 switching waveform, with respect to minimizing harmonic distortion, is a less important than the functioning H-bridge phases providing greater output current to drive the load. Operating the semiconductor devices for the functioning H-bridge phases within acceptable thermal limits assumes a higher priority. Higher switching rates due to the insertion of notches may incur higher switching losses on the semiconductor switches, putting the semiconductor switch closer to thermal margins and potentially impacting reliability of operation. Consequently, the functioning H-bridge phases may be switched at a normal or slightly reduced frequency and a fixed synchronous pulse pattern without notches may be employed, in lieu of the ZCnotch2 switching waveform.

Fixed pulse patterns applied to the semiconductor switches of the individual H-bridges are 120 electrical degrees apart, resulting in the line output between phases (Phase A to Phase B for example) being 120 electrical degrees apart. No notches are inserted around fundamental frequency pulses of the pulse patterns to improve harmonic distortion performance. Insertion of notches would add to the effective switching frequency of the bridge output.

Figure 7A:
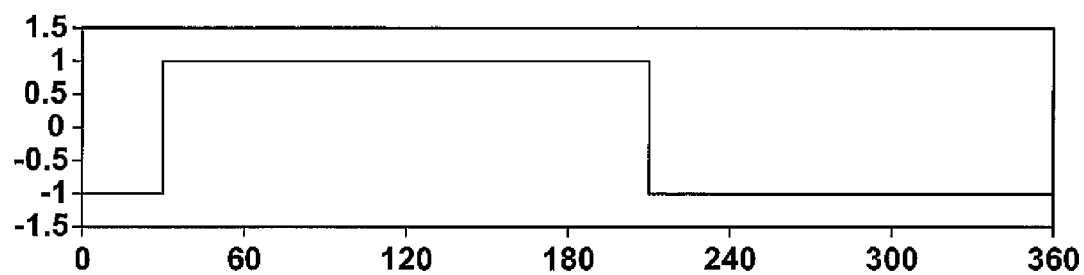
FIGS. 7A-7D provide a graph illustrating typical input and output waveforms for a wye-connected H-bridge with one H-bridge output phase bypassed and utilizing a synchronized switching waveform without notches.
Figure 7B:
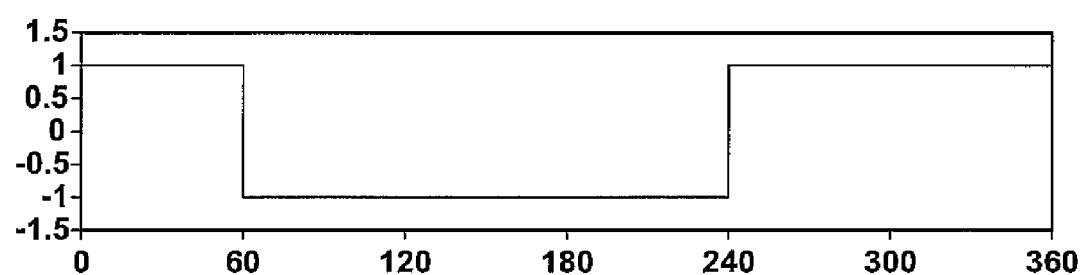
Figure 7C:
Figure 7D:
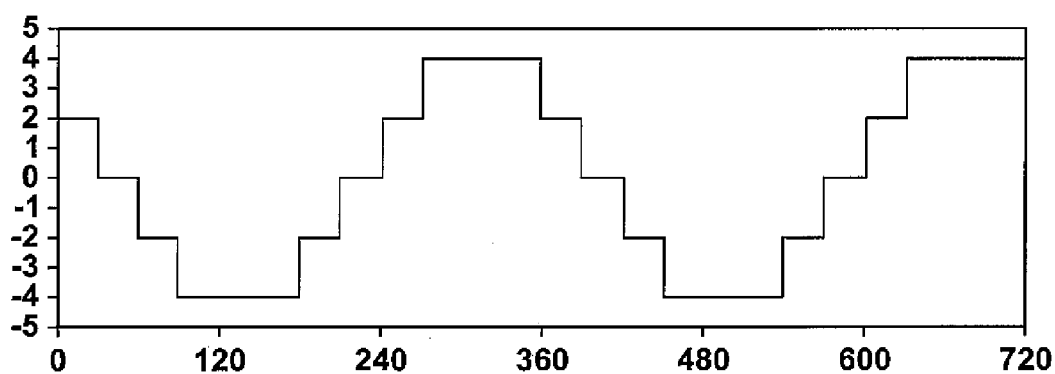

FIGS. 7A-7D provides a graph illustrating typical input and output waveforms for a wye-connected H-bridge with one H-bridge output phase bypassed and utilizing a synchronized switching waveform without notches. FIG. 7A illustrates a synchronous input waveform for one phase of a single phase H-bridge. FIG. 7B illustrates a waveform for a second phase of a single phase H-bridge with synchronized switching waveform without notches. FIG. 7C illustrates a waveform for an output of a single H-bridge (representing a line-to-line output between a functioning H-bridge output and a bypassed H-bridge output). FIG. 7D illustrates a typical output waveform (line-to-line) across the two functioning H-bridge output phases.

The switching signals for the bridge may be controlled by a microprocessor, an integrated circuit, a field programmable gate array (FPGA) or other electronic circuits known in the art.

A SABER analysis of normal operation (N) and operation with one failed bridge (N-1) was performed. For normal operation, a 567 Hz sine wave is modulated at 1134 Hz with the ZCnotch2 switching waveform. For the N-1 operation, output is a 510 Hz sine wave modulated at 510 Hz using 120-degree width pulses. For the analysis, each H-bridge employed ABB 5SHX 35L4511 IGCTs with Eoff reduced by 22.5% with RC snubbers, and with a Eupec D1331SH diode. TABLE 1 provides a comparison of operating parameters for converter operation under the N and N-1 conditions. System parameters include a 3300 VAC 0.8 PF motor with a 2200V dc-link for normal and 2800V dc-link for N-1 operation, 40 degree C. water temperature and 115 C maximum junction temperature. TABLE 2 provides the parameters employed in the SABER analysis of the H-bridge operation. TABLE 3 provides a comparative thermal performance for the IGCT semiconductor switches and diodes under N and N-1 conditions, indicating acceptable thermal performance under the operating scheme for both conditions.

TABLE 1

| Operating Mode | Normal (N) | One Failed (N − 1) |
| --- | --- | --- |
| DC-Bus Voltage | 2220 Vdc | 2800 Vdc |
| Output Current | 1491 A RMS | 1627 A RMS |
| Output Voltage | 3300 V 1-1 | 2200 V 1-1 |
| Current THD | 2.16% | 7.49% |
| Output Frequency | 567 Hz | 510 Hz |
| Output MVA | 8.52 MVA | 6.20 MVA |
| MW @ 0.8 PF | 6.82 MW | 5.58 MW |
| Motor RPM | 17000 | 15300 |

TABLE 2

| Parameter | ZCnotch2 | Synchronous Non-Notched | Units |
|---|---|---|---|
| Vbus actual | 2800 | 2200 | V |
| Current | 1491 | 1627 | A RMS |
| Voltage L-L | 3300 | 2200 | V RMS |
| Power Factor | 0.63 | 0.0.78 | |
| Output Frequency | 567 | 510 | Hz |
| Switching Frequency | 1134 | 510 | Hz |
| IGCT Conduction Voltage | 1.4 | 1.4 | V |
| IGCT Conduction Resistance | 0.0007 | 0.0007 | Ohm |
| IGCT On Switch Loss | 0.577 | 0.727 | Joules at |
| IGCT Off Switch Loss | 4.13 | 5.2 | Joules at |
| IGCT Thermal tau | 0.25 | 0.25 | Second |
| IGCT Thermal res J-hs | 0.012 | 0.012 | C/W |
| Diode Conduction Voltage | 1.2 | 1.2 | Volt |
| Diode Conduction Resistance | 0.0014 | 0.0014 | Ohm |
| Diode Thermal tau | 0.2 | 0.2 | Second |
| Diode Thermal Res J-hs | 0.01105 | 0.01105 | C/W |
| Water Temperature | 40 | 40 | Degree |
| Thermal Resistance HS-water | 0.007 | 0.007 | C/W |
| Power Flow | From Line | From Line | |
| Power Factor | Lagging | Lagging | |

TABLE 3

| Device | Parameter | Normal H-Bridge Operation | Failed H-Bridge (N − 1) Operation |
|---|---|---|---|
| IGCT | Hotspot Temperature | 68.8 C | 68.8 C |
| | Delta Temperature | 0.24 C | 0.26 C |
| | Ave. Temperature | 114.8 C | 114.8 C |
| | Max Temperature | 115.0 C | 115.0 C |
| Diode | Hotspot Temperature | 48.3 C | 42.3 C |
| | Delta Temperature | 0.2 C | 0.0 C |
| | Average Temperature. | 62.4 C | 47.7 C |
| | Maximum Temperature | 62.5 C | 47.7 C |
| IGCT | On switching loss | 55.6 W | 0.0 W |
| | Off switching loss | 2562.9 W | 2281.3 W |
| | Conduction loss | 1463.2 W | 1793.2 W |
| | Leakage loss | 27.4 W | 43.6 W |
| | Total loss | 4109.1 W | 4118.0 W |
| Diode | Reverse Recovery Loss | 783.2 W | 0.0 W |
| | Conduction loss | 324.0 W | 194.9 W |
| | Leakage Loss | 82.1 W | 130.7 W |
| | Total Loss | 1189.4 W | 325.6 W |

Further, while an exemplary 6 MW HSEM has been described in the analysis, application of the ZCnotch2 switching signal to HSEMs with other ratings is considered within the scope of the present invention. Additionally, it should be recognized that the inventive topology has application to a broad range of ac-motors and should not be restricted to HSEMs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A three-phase, wye-connected H-bridge converter, the H-bridge converter comprising:
   a plurality of semiconductor H-bridge output phases, each H-bridge output phase including a power source, a dc-bus, an output leg and a connecting leg, a phase output of the converter from a midpoint of each output H-bridge leg, and a connecting output from a midpoint of each connecting semiconductor H-bridge leg;
   a connection between the connecting output of each H-bridge leg and a common wye-point;
   a gating source for the semiconductor H-bridge converter;
   a plurality of H-Bridge bypass contactors, at least one bypass contactor being connected between the phase output and the connecting output of each H-bridge output phase; and
   a control function for operating with a failed H-bridge output phase.

2. The three-phase, wye-connected H-bridge converter according to claim 1, wherein the control function comprises:
   the at least one bypass contactor for the H-bridge output phase being in a normal open state when the associated H-bridge output phase is functioning normally and being in a closed state when the H-bridge output phase is failed.

3. The control function according to claim 2, the control function further comprising:
   at least one of controlling the contactor state according to a manual operator-initiated signal for a H-bridge failure and controlling the contactor state automatically according to a predetermined criteria for H-bridge failure.

4. The plurality of H-bridge bypass contactors according to claim 1, wherein the at least one bypass contactor for the H-bridge output phase may comprise:
   at least one of a mechanical contactor and a semiconductor contactor.

5. The three-phase, wye-connected H-bridge converter, the H-bridge converter according to claim 1, wherein the power source comprises:
   a dual level voltage source for each H-bridge output phase.

6. The three-phase, wye-connected H-bridge converter according to claim 5, wherein the dual level voltage source comprises:
   a plurality of three-phase transformer secondary windings, each transformer secondary winding servicing one H-bridge output phase, including low voltage taps and high voltage taps for each H-bridge output phase;
   a plurality of three-phase full wave rectifiers, each rectifier providing a dc voltage to the dc-bus for each H-bridge output phase, wherein inputs to the rectifier are provided from the associated transformer secondary winding;
   a high voltage dc bus contactor providing high voltage outputs from the high voltage taps of the transformer secondary winding output to the input of the three-phase full wave rectifier for an H-bridge output phase; and
   a low voltage dc bus contactor providing low voltage outputs from the low voltage taps of the transformer secondary winding to the input of the three-phase full wave rectifier for an H-bridge output phase.

7. The three-phase, wye-connected H-bridge converter according to claim 6; the control function for operating with a failed H-bridge output phase further comprising:
   the low voltage dc bus contactors for the H-bridge output phase being in a closed state when the associated H-bridge output phase is functioning normally and being in a open state when the H-bridge output phase is failed; and
   the high voltage dc bus contactor for the H-bridge output phase being in a normal open state when the associated H-bridge output phase is functioning normally and being in a closed state when the H-bridge output phase is failed.

8. The three-phase, wye-connected H-bridge converter according to claim 1, wherein the dual level voltage source comprises:
- a plurality of three-phase transformer secondary windings, each transformer secondary winding servicing one H-bridge output phase, including low voltage taps and high voltage taps for each H-bridge output phase;
- a three-phase full wave rectifier providing a dc voltage to the dc-bus for each H-bridge output phase, wherein inputs to the rectifier are provided from the low voltage taps of the associated transformer secondary winding;
- a three-phase full wave rectifier providing a dc voltage to the dc-bus for each H-bridge output phase, wherein inputs to the rectifier are provided from the high voltage taps of the associated transformer secondary winding; and
- a high voltage dc bus contactor providing a high voltage output from the high voltage taps of the transformer secondary winding output to the input of the three-phase full wave rectifier for an H-bridge output phase.

9. The three-phase, wye-connected H-bridge converter according to claim 8; the control function for operating with a failed H-bridge output phase comprising:
- the high voltage dc bus contactor for the H-bridge output phase being in a normal open state when the associated H-bridge output phase is functioning normally and being in a closed state when the H-bridge output phase is failed.

10. The three-phase, wye-connected H-bridge converter according to claim 1, the gating source for the semiconductor H-bridge converter comprising:
- a synchronous pulse pattern for the H-bridge semiconductors establishing an output frequency to a high-speed electric motor.

11. The three-phase, wye-connected H-bridge converter according to claim 10, the gating source the semiconductor H-bridge converter comprising:
- a synchronous pulse pattern with no notches, the synchronous pulse pattern being established to reduce switching loss when one H-bridge has failed.

12. The three-phase, wye-connected H-bridge converter, the H-bridge converter according to claim 11, the H-bridge converter further comprising:
- a bypassed H-bridge output phase;
- an dc-bus voltage elevated above the nominal dc-bus voltage for three H-bridge output phase operation; and
- the gating source of two functioning semiconductor H-bridge output phases including 120-degree width pulses and a reduced operating frequency of the converter positioned to switching loss at the reduced operating frequency and power factor for the high-speed electric motor.

13. The three-phase, wye-connected H-bridge converter according to claim 10, the gating source of the semiconductor H-bridge converter further comprising:
- two notches per cycle of the pulse pattern.

14. The three-phase, wye-connected H-bridge converter according to claim 13, the notches of the gating source further comprising:
- the notches having an optimized width and optimized position with respect to a zero-crossing of line current to minimize switching loss and harmonic distortion at the nominal operating frequency and power factor for the high-speed electric motor.

15. A method for operating a three-phase, wye-connected H-bridge converter including a plurality of semiconductor H-bridge output phases, each H-bridge output phase with a dual-voltage power source, the dual level voltage source provided by high voltage and low voltage taps of an associated transformer secondary winding through dc bus contactors and rectifiers; a dc-bus; an output leg and a connecting leg; a phase output of the converter from a midpoint of each output H-bridge leg; a connecting output from a midpoint of each connecting semiconductor H-bridge leg tied at wye-point; an H-bridge bypass contactor for each H-bridge output phase; a low voltage source and a high voltage source to the dc-bus; and a gating source for the semiconductor H-bridge; the method comprising:
- maintaining the H-bridge bypass contactor for each H-bridge output phase in an open state for all H-bridge output phases functioning normally;
- closing the H-bridge bypass contactor for one, failed H-bridge output phase;
- supplying a low voltage source to the dc-bus when all H-bridge output phases are functioning normally;
- supplying a high voltage source to the dc-bus when one H-bridge output is failed; and
- controlling the semiconductor H-bridge output phases with the gating source.

16. The method for operating a three-phase, wye-connected H-bridge converter according to claim 15, the step of supplying a low voltage source comprising:
- closing the dc bus contactor for low voltage to two functioning H-bridge output phases one H-bridge output phase has failed.

17. The method for operating a three-phase, wye-connected H-bridge converter according to claim 15, the step of providing high voltage comprising:
- closing the dc bus contactor for high voltage to two functioning H-bridge output phases when one H-bridge output phase has failed.

18. The method for operating a three-phase, wye-connected H-bridge converter according to claim 15, the method further comprising:
- gating semiconductor switches of the H-bridge converter according to a zero-current switching pattern at a normal operating frequency with two notches when all H-bridge output phases are functioning normally.

19. The method for operating a three-phase, wye-connected H-bridge converter according to claim 18, the zero current switching pattern further comprising:
- optimizing harmonic distortion output of the converter by selectively positioning of the notches with respect to a zero-current crossing of line current and selectively choosing a notch width.

20. The method for operating a three-phase, wye-connected H-bridge converter according to claim 17, the method further comprising:
- gating semiconductor switches of the H-bridge converter according to a synchronous switching pattern with no notches for at least one of a normal operating frequency and a reduced operating frequency of the converter.

* * * * *